United States Patent
Abhyankar et al.

(10) Patent No.: US 11,714,843 B2
(45) Date of Patent: Aug. 1, 2023

(54) ACTION OBJECTS IN A SEMANTIC GRAPH

(71) Applicant: MicroStrategy Incorporated, Vienna, VA (US)

(72) Inventors: Saurabh Abhyankar, McLean, VA (US); Scott Rigney, Arlington, VA (US); Timothy Lang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 681 days.

(21) Appl. No.: 16/514,946

(22) Filed: Jul. 17, 2019

(65) Prior Publication Data

US 2020/0250230 A1    Aug. 6, 2020

Related U.S. Application Data

(60) Provisional application No. 62/801,239, filed on Feb. 5, 2019, provisional application No. 62/801,290, filed
(Continued)

(51) Int. Cl.
*G06F 16/36* (2019.01)
*G06T 11/20* (2006.01)
(Continued)

(52) U.S. Cl.
CPC .......... *G06F 16/36* (2019.01); *G06F 16/3344* (2019.01); *G06F 16/9024* (2019.01);
(Continued)

(58) Field of Classification Search
None
See application file for complete search history.

(56) References Cited

U.S. PATENT DOCUMENTS

| 8,661,012 B1 | 2/2014 | Baker et al. |
| 8,972,467 B2 | 3/2015 | Heinrich et al. |

(Continued)

OTHER PUBLICATIONS cio.com [online], "Why your BI strategy needs a universal semantic data layer," Nov. 10, 2017, retrieved on Feb. 27, 2020, retrieved from URL <https://www.cio.com/article/3236566/why-your-bi-strategy-needs-a-universal-semantic-data-layer.html>, 6 pages.
(Continued)

*Primary Examiner* — Thu N Nguyen
(74) *Attorney, Agent, or Firm* — Fish & Richardson P.C.

(57) ABSTRACT

Methods, systems, and apparatus, including computer programs encoded on computer-readable storage media, for providing action objects in a semantic graph. IN some implementations, semantic graph data indicates a semantic graph of objects and relationships between the objects. The semantic graph data defines an action object that represents an action that can be initiated, and the semantic graph data indicates a particular object type or a particular data type with which the action object can be used. An object of a particular object type or data of the particular data type is identified as being involved in processing of the one or more computers. In response to identifying the use of the object of the particular object type or data of the particular data type, an indication is provided that the action represented by the action object can be initiated.

16 Claims, 7 Drawing Sheets

- Detect use of a Data Cube object used to create visualizations in a user interface
- Based on Semantic Graph connections, determine that the action object "Refresh Data Cube" represents an action that can be invoked for this object type
- Determine that conditions for invoking the action are satisfied (e.g., user is determined to have authorization to alter the data cube)
- In response to the determinations, add a "Refresh Data Cube" control to the user interface

- Identify a data element having a currency data type
- Based on Semantic Graph connections, determine that the action object "Convert Currency" represents an action that can be invoked for this data element
- In response to the determination, add a user interface control that can initiate the action represented by the "Convert Currency" action object

Related U.S. Application Data on Feb. 5, 2019, provisional application No. 62/821,132, filed on Mar. 20, 2019.

(51) Int. Cl.

| | |
|---|---|
| *G06F 16/9535* | (2019.01) |
| *G06F 16/33* | (2019.01) |
| *G06F 16/901* | (2019.01) |
| *G06F 40/30* | (2020.01) |
| *G06F 16/953* | (2019.01) |
| *G06N 5/04* | (2023.01) |
| *G10L 13/027* | (2013.01) |

(52) U.S. Cl.
CPC ........ *G06F 16/9027* (2019.01); *G06F 16/953* (2019.01); *G06F 16/9535* (2019.01); *G06F 40/30* (2020.01); *G06N 5/04* (2013.01); *G06T 11/206* (2013.01); *G10L 13/027* (2013.01)

(56) References Cited

U.S. PATENT DOCUMENTS

| | | | |
|---|---|---|---|
| 9,531,829 B1 | 12/2016 | Anand et al. | |
| 10,810,371 B2* | 10/2020 | Shinn | G06F 40/289 |
| 11,550,838 B2 | 1/2023 | Abhyankar et al. | |
| 2004/0220905 A1 | 11/2004 | Chen et al. | |
| 2008/0060051 A1 | 3/2008 | Lim | |
| 2008/0244540 A1 | 10/2008 | Feblowitz et al. | |
| 2011/0313987 A1 | 12/2011 | Ghosh et al. | |
| 2011/0320187 A1 | 12/2011 | Motik et al. | |
| 2012/0158636 A1 | 6/2012 | Bowers et al. | |
| 2012/0221555 A1 | 8/2012 | Byrne et al. | |
| 2012/0221558 A1 | 8/2012 | Byrne et al. | |
| 2012/0290518 A1 | 11/2012 | Flinn et al. | |
| 2013/0036117 A1 | 2/2013 | Fisher et al. | |
| 2013/0073979 A1* | 3/2013 | Shepherd | G06F 40/284 |
| | | | 715/744 |
| 2013/0254736 A1 | 9/2013 | Chen et al. | |
| 2013/0275440 A1 | 10/2013 | Amer-Yahia et al. | |
| 2014/0200891 A1 | 7/2014 | Henri et al. | |
| 2014/0236570 A1 | 8/2014 | Heck et al. | |
| 2014/0236579 A1 | 8/2014 | Kurz | |
| 2014/0267344 A1* | 9/2014 | Wilson | G06T 13/80 |
| | | | 345/582 |
| 2015/0106078 A1 | 4/2015 | Chang | |
| 2015/0106156 A1 | 4/2015 | Chang et al. | |
| 2015/0227563 A1 | 8/2015 | Walkingshaw et al. | |
| 2015/0293954 A1 | 10/2015 | Hsiao et al. | |
| 2015/0347905 A1 | 12/2015 | Chen et al. | |
| 2016/0048368 A1* | 2/2016 | McGibney | G06F 3/04883 |
| | | | 345/2.3 |
| 2016/0103878 A1 | 4/2016 | Boe et al. | |
| 2016/0179864 A1 | 6/2016 | Roberts | |
| 2016/0232157 A1 | 8/2016 | Mansour et al. | |
| 2016/0267198 A1 | 9/2016 | Lahmer et al. | |
| 2016/0275204 A1 | 9/2016 | Miranker et al. | |
| 2016/0328467 A1 | 11/2016 | Zou et al. | |
| 2016/0357872 A1 | 12/2016 | Fader et al. | |
| 2017/0024460 A1 | 1/2017 | Mac an tSaoir et al. | |
| 2017/0063889 A1 | 3/2017 | Muddu et al. | |
| 2017/0085446 A1 | 3/2017 | Zhong et al. | |
| 2017/0147635 A1 | 5/2017 | McAteer et al. | |
| 2017/0228435 A1 | 8/2017 | Tacchi et al. | |
| 2017/0237801 A1 | 8/2017 | Baluja et al. | |
| 2017/0262520 A1 | 9/2017 | Mitkar et al. | |
| 2017/0293947 A1 | 10/2017 | Singh | |
| 2017/0329844 A1 | 11/2017 | Tacchi et al. | |
| 2017/0372204 A1 | 12/2017 | Sweeney et al. | |
| 2018/0039854 A1 | 2/2018 | Wren | |
| 2018/0069887 A1 | 3/2018 | Chauhan et al. | |
| 2018/0089281 A1 | 3/2018 | Li et al. | |
| 2018/0089328 A1 | 3/2018 | Bath et al. | |
| 2018/0181667 A1 | 6/2018 | Kolb et al. | |
| 2018/0189388 A1 | 7/2018 | Soares et al. | |
| 2018/0189389 A1* | 7/2018 | Baldini Soares ... | G06F 16/9024 |
| 2018/0196831 A1 | 7/2018 | Maybee et al. | |
| 2018/0241660 A1 | 8/2018 | Fletchet et al. | |
| 2018/0246942 A1 | 8/2018 | Chen et al. | |
| 2018/0253676 A1 | 9/2018 | Sheth et al. | |
| 2018/0268253 A1 | 9/2018 | Hoffman et al. | |
| 2018/0307744 A1 | 10/2018 | Gadekar et al. | |
| 2018/0365309 A1 | 12/2018 | Oliner et al. | |
| 2019/0005025 A1 | 1/2019 | Malabarba | |
| 2019/0108274 A1 | 4/2019 | DaBoll-Lavoie et al. | |
| 2019/0220471 A1 | 7/2019 | Toledo et al. | |
| 2019/0250998 A1 | 8/2019 | Bedadala et al. | |
| 2019/0339950 A1 | 11/2019 | Meyer et al. | |
| 2020/0226156 A1 | 7/2020 | Borra et al. | |
| 2020/0250217 A1 | 8/2020 | Abhyankar et al. | |
| 2020/0250235 A1 | 8/2020 | Abhyankar et al. | |
| 2020/0250245 A1 | 8/2020 | Abhyankar et al. | |
| 2020/0252281 A1 | 8/2020 | Abhyankar et al. | |
| 2020/0301953 A1 | 9/2020 | Abhyankar et al. | |
| 2020/0410514 A1 | 12/2020 | Livhits et al. | |

OTHER PUBLICATIONS datanami.com [online], "Why Enterprise Knowledge Graphs Need Semantics," Oct. 2, 2017, retrieved on Feb. 27, 2020, retrieved from URL <https://www.datanami.com/2017/10/02/enterprise-knowledge-graphs-need-semantics/>, 3 pages.

ir.microstrategy.com [online], "MicroStrategy Offers a Better Long-Term Solution for Enterprises Caught in Analytics Industry Upheaval," Jan. 11, 2019, retrieved on Feb. 27, 2020, retrieved from URL <https://ir.microstrategy.com/news-releases/news-release-details/microstrategy-offers-better-long-term-solution-enterprises>, 5 pages.

microstrategy.com [online], "2020 Enterprise Analytics Trends: The Semantic Graph Becomes Paramount to Delivering Business Value," Dec. 12, 2019, retrieved on Feb. 27, 2020, retrieved from URL <https://www.microstrategy.com/us/resources/blog/bi-trends/2020-enterprise-analytics-trends-the-semantic-graph-becomes-paramount-to-delivering-business-value>, 7 pages.

microstrategy.com [online], "A Semantic Graph Unlocks HyperIntelligence," Nov. 20, 2019, retrieved on Feb. 27, 2020, retrieved from URL <https://www.microstrategy.com/us/resources/blog/bi-trends/a-semantic-graph-unlocks-hyperintelligence>, 9 pages.

microstrategy.com [online], "MicroStrategy 2019: Built for Breakthroughs," Jan. 7, 2019, retrieved on Feb. 27, 2020, retrieved from URL <https://www.microstrategy.com/us/resources/blog/news-and-events/microstrategy-2019-built-for-breakthroughs>, 8 pages.

microstrategy.com [online], "The Enterprise Semantic Graph" Feb. 13, 2019, retrieved on Feb. 27, 2020, retrieved from URL <https://www.microstrategy.com/getmedia/a6ad9b4a-a0fe-4247-8ae5-477c0efb4458/Published-World-2019-Enterprise-Semantic-Graph>, 21 pages.

microstrategy.com [online], "The Enterprise Semantic Graph: Laying the Foundation for Revolutionary Applications," Jan. 15, 2019, retrieved on Feb. 27, 2020, retrieved from URL <https://www.microstrategy.com/us/resources/blog/bi-trends/the-enterprise-semantic-graph-laying-the-foundation-for-revolutionary-applications>, 7 pages.

prnewswire.com [online], "MicroStrategy 2019, the World's Most Advanced Analytics & Mobility Platform, Powers Decisions for Every Moment of the Day," Jan. 10, 2019, retrieved on Feb. 27, 2020, retrieved from URL <https://www.prnewswire.com/in/news-releases/microstrategy-2019-the-world-s-most-advanced-analytics-amp-mobility-platform-powers-decisions-for-every-moment-of-the-day-867142447.html>, 10 pages.

wikipedia.com[online], "Draft: Semantic Graph" Nov. 9, 2018, retrieved on Nov. 15, 2018, retrieved from URL <https://en.wikipedia.org/w/index.php?title=Draft:Semantic_Graph&oldid=868720195>, 5 pages.

U.S. Office Action in U.S. Appl. No. 16/677,427, dated Nov. 5, 2021, 30 pages.

U.S. Office Action in U.S. Appl. No. 16/677,183, dated Apr. 21, 2021, 21 pages.

U.S. Office Action in U.S. Appl. No. 16/677,183, dated Nov. 4, 2020, 17 pages.

(56) References Cited

OTHER PUBLICATIONS

U.S. Office Action in U.S. Appl. No. 16/450,673, dated Sep. 22, 2021, 21 pages.
U.S. Office Action in U.S. Appl. No. 16/677,183, dated Sep. 10, 2021, 26 pages.
Office Action in U.S. Appl. No. 16/450,673, dated Jun. 8, 2022, 15 pages.
Office Action in U.S. Appl. No. 16/450,673, dated Jan. 13, 2022, 15 pages.
Office Action in U.S. Appl. No. 16/589,053, dated Mar. 2, 2022, 20 pages.
Office Action in U.S. Appl. No. 16/677,183, dated May 4, 2022, 31 pages.
Office Action in U.S. Appl. No. 16/677,427, dated May 5, 2022, 37 pages.
Office Action in U.S. Appl. No. 16/678,948, dated Mar. 31, 2022, 17 pages.
Notice of Allowance in U.S. Appl. No. 16/589,053, dated Sep. 8, 2022, 15 pages.
Office Action in U.S. Appl. No. 16/677,183, dated Nov. 9, 2022, 25 pages.
Office Action in U.S. Appl. No. 16/677,427, dated Oct. 18, 2022, 46 pages.
Office Action in U.S. Appl. No. 16/678,948, dated Nov. 10, 2022, 15 pages.

\* cited by examiner

Action Objects 400

| Action Object ID | Action Performed | Input Type | Output Type | Conditions / Requirements |
|---|---|---|---|---|
| 132 | Initiate Phone Call | Phone Number Attribute | Confirmation of operation | Cellular device or VOIP app |
| 6224 | Generate Report | Document Object ID | Document ID for Generated Report | Access Permission for the Report |
| 1324 | Generate Invoice | Customer Object ID | Document ID for Generated Invoice | User Authorization for Account of Customer |
| 9542 | Convert Currency to U.S. Dollar | Data Element with Currency Data Type | Value with Currency Data Type | |
| 554 | Refresh Data Cube | Data Cube Object ID | Confirmation of operation | User Permission to Edit Data Cube |
| ... | ... | ... | ... | ... |

FIG. 4

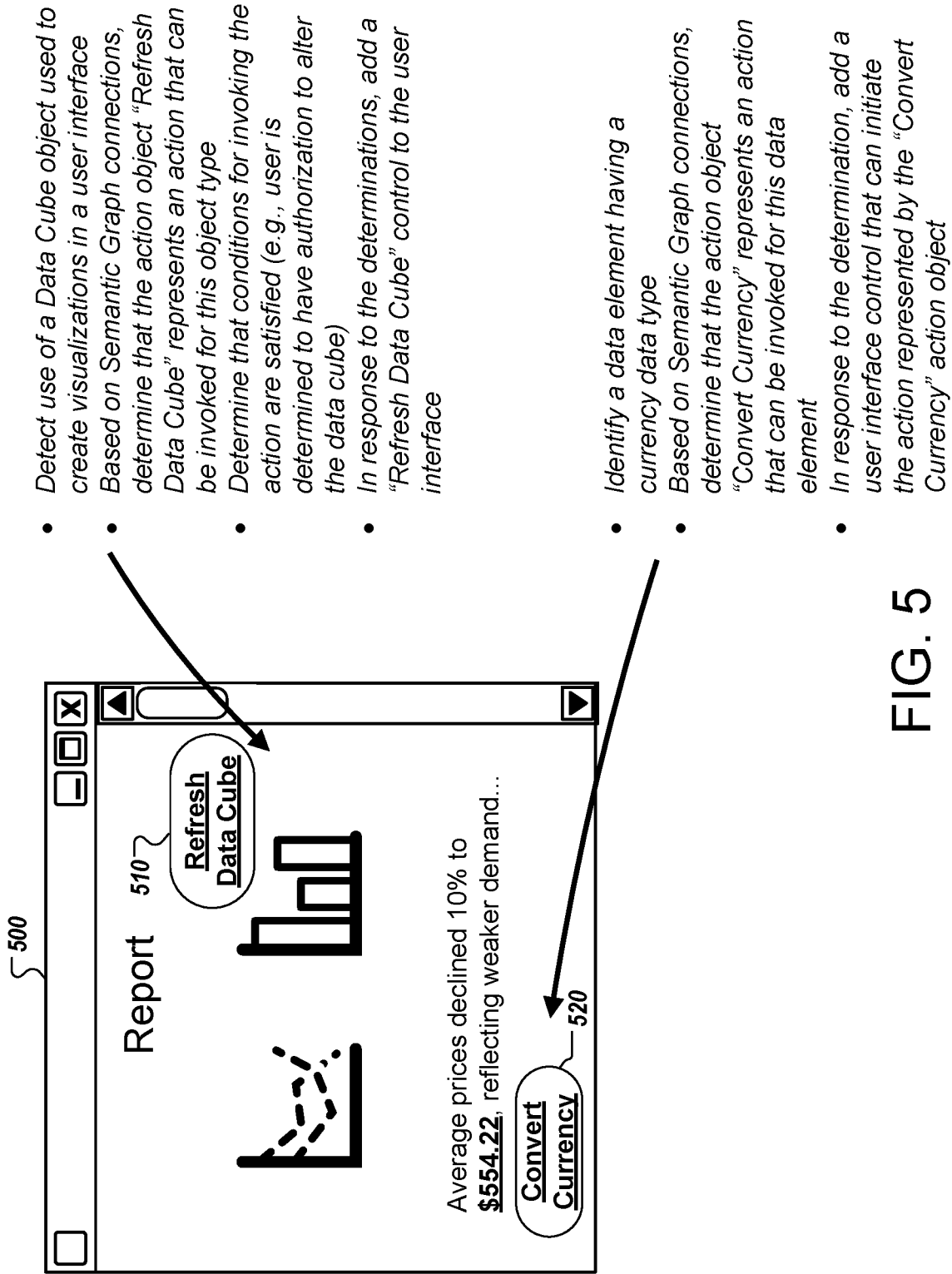

FIG. 5

- Detect use of a Data Cube object used to create visualizations in a user interface
- Based on Semantic Graph connections, determine that the action object "Refresh Data Cube" represents an action that can be invoked for this object type
- Determine that conditions for invoking the action are satisfied (e.g., user is determined to have authorization to alter the data cube)
- In response to the determinations, add a "Refresh Data Cube" control to the user interface

- Identify a data element having a currency data type
- Based on Semantic Graph connections, determine that the action object "Convert Currency" represents an action that can be invoked for this data element
- In response to the determination, add a user interface control that can initiate the action represented by the "Convert Currency" action object

ACTION OBJECTS IN A SEMANTIC GRAPH

CROSS-REFERENCE TO RELATED APPLICATIONS

This application claims the benefit of U.S. provisional patent application No. 62/801,239, filed on Feb. 5, 2019, U.S. provisional patent application No. 62/801,290, filed on Feb. 5, 2019, and U.S. provisional patent application No. 62/821,132, filed on Mar. 20, 2019. The entire contents of each of the prior applications is incorporated by reference.

BACKGROUND

Computer systems can be configured to perform different actions. In many cases, the actions that can be performed need to be programmed in, e.g., specified in software code, or specifically registered in order to be made available.

SUMMARY

In some implementations, a computing system stores semantic graph data indicating objects and relationships among the objects. The semantic graph data can define certain types of objects, referred to as "action objects" in this document, that represent actions that can be performed. Each action object can represent a single action or a combination of actions, such as a series of operations or a complex workflow. These actions can be actions within an analytics system (e.g., refresh a data source, generate a visualization, etc.) or actions outside the analytics system (e.g., initiate a phone call, call a function from a third-party application programming interface (API), etc.).

The semantic graph data can associate each action object with certain data elements, e.g., attributes, dimensions, facts, measures, metrics, objects, data types, etc., on which the action represented by the action object can be performed. Then, when a particular data element is used (e.g., in search results, in user interface data, in a recommendation, etc.), the semantic graph data can be used to dynamically identify which action objects are associated with the particular data element, and thus which actions can be performed on the data element or using the data element. The available actions can be indicated to a user on a user interface, for example, using a dynamically populated menu, a customized interface, or interactive elements that are selectable to perform the actions. As another example, the available actions for a data element can be indicated to a computer system, for the computer system to selectively initiate one or more of the actions automatically in some implementations.

This use of action objects in a semantic graph can provide a highly scalable, extensible, and customizable framework for integrating various types of actions with databases and schemas. For example, the ability to initiate a phone call can be easily added for many different types of objects by creating a "phone call" action object and associating it with a "phone number" attribute in the semantic graph. Many different entities may be capable of receiving a phone call, e.g., employees, customers, suppliers, etc. The objects that represent these entities in the semantic graph (e.g., employee objects, customer objects, supplier objects, etc.) can be defined to have the "phone number" attribute. By virtue of having the "phone number" attribute, each of these objects of different types become linked to the "phone call" action object in the semantic graph. Whenever the objects or their "phone number" attributes are used in processing or output of an analytics system, the analytics system can use the semantic graph association to make the action of the "phone call" available, for example, through data for presentation in a user interface at a client device.

The use of action objects can reduce or avoid the need to manually associate objects with specific actions. For example, when a new object type, such as an investor object or lender object, can be created and added to the semantic graph, and can be defined to include a "phone number" attribute. Defining the object in this manner can automatically enable the functionality of the "phone call" action object, simply because the "phone number" attribute is present. The user that creates the new object type does not need to manually enable the "phone call" action, and indeed the user creating the object may not even know that the system provides the phone call functionality. Similarly, the system does not need to register the "phone call" action with the object type. The action represented by the "phone call" action object is automatically made available for all objects (e.g., instances) of the new object type simply because the "phone number" attribute is part of the object definition. In addition, actions of any other action objects associated with the "phone number" attribute, such as a "send SMS text message" action object, are also automatically made available for the new object type. Thus, at least in some implementations, the action objects can be associated with data elements such as attributes in the semantic graph, so that semantic graph connections indicate which actions are available without the need to manually define or register actions for each object type.

In general, a semantic layer can represent and characteristics of and relationships among data items. For example, typical objects in a semantic layer are representations that define or model properties of an item. The action objects in this document extend the capability of a semantic layer by enabling objects to initiate actions inside the analytics system as well as outside the analytics system. Thus, the action objects to not simply provide information about an item, they can represent and provide access to actions such as generating new data, changing relationships in the semantic graph, interacting with external systems, and more.

An action object may be defined to initiate or perform an action when invoked. An action object can be represented in the semantic graph like other objects and can be connected to objects through semantic graph connections. However, unlike other types of objects represented in the semantic graph, the action object can be defined to have instructions, operations, API calls, executable or interpretable code, or other information that can be invoked to perform one or more actions. In this manner, an action object can be an object that represents a function or a series of operations that can be initiated.

Because the action objects are represented in the semantic graph along with other types of objects, the set of actions that can be performed for an object can be dynamically selected using the semantic graph connections. For example, if an analytics system is processing a query and identifies an object as a candidate search result, the semantic graph can be used to dynamically determine the set of associated action objects (e.g., a "generate visualization" action object, a "save to library" action object, a "share document" action object, etc.), and thus the set of actions that are available for the candidate search result. These actions may be invoked by the analytics system itself, e.g., to generate a visualization to include as part of a search result, and/or may be indicated to a user, e.g., with interactive controls allowing a user to initiate generating a visualization or sharing a search result document. These are just a few examples, and action objects can be used to implement many other types of business logic, user initiated actions, internal processing of the analytics system, and more.

In some implementations, a method performed by one or more computers includes: storing semantic graph data indicating a semantic graph of objects and relationships between the objects, wherein the semantic graph data defines an action object that represents an action that can be initiated, wherein the semantic graph data indicates a particular object type or a particular data type with which the action object can be used; identifying an object of a particular object type or data of the particular data type involved in processing of the one or more computers; and in response to identifying the use of the object of the particular object type or data of the particular data type, providing an indication that the action represented by the action object can be initiated.

In some implementations, the indication comprises a control or option to initiate the action.

In some implementations identifying the object of the particular object type or the data of the particular data type comprises: determining that an operation of the one or more computers involves a first object that is not directly connected to the action object in the semantic graph data; and determining, based on semantic graph data for the particular object, that the first object has a predetermined relationship in the semantic graph with the object of the particular object type or the data of the particular data type. Providing the indication that the action represented by the action object can be initiated comprises providing an indication that the action can be initiated for an item represented in the semantic graph by the first object based on determining that the first object has a predetermined relationship in the semantic graph with the object of the particular object type or the data of the particular data type.

In some implementations, the predetermined relationship is that the object of particular object type or the data of the particular data type is an attribute or property of the first object.

In some implementations, identifying an object of the particular object type or data of the particular data type involved in processing of the one or more computers comprises identifying the object of the particular object type or data of the particular data type in search results, a recommendation, a user interface, metadata for a user interface, data retrieved from a database, a document, or a file.

In some implementations, the particular object type or the particular data type is a particular data type. For example, the data type could be an integer, a Boolean value, a floating point number, a text string, a character, a ratio, a percentage, an image, an audio file, a particular type of data structure, etc. In some implementations, the data type is additionally or alternatively represents a particular semantic meaning, so that only data having a particular semantic meaning is accepted as supporting performance of the action of the action object. For example, even for a numerical value, the action object may require that the value is tagged or otherwise indicated to be, e.g., a count of objects, a currency amount, a time (and potentially, a minute, hour, day, month, year, etc.) and so on.

In some implementations, the particular object type or the particular data type is a particular object type that represents a combination of data of a first data type, wherein the data of the first data type has a specific one of multiple different semantic meanings for the first data type in the semantic graph.

In some implementations, the particular object type or the particular data type is an attribute, a fact, a metric, or an object representing a person, a place, a thing, a concept, or data.

In some implementations, the particular object type or the particular data type is a particular object type representing at least one of a person, a physical item, a location, a measurement, an information card, an access control limitation, a privacy setting, a configuration parameter of a computing device, a document, a file, a network resource, or other item.

In some implementations, identifying the use of the object of the particular object type or data of the particular data type comprises determining that an operation of an analytics system involves the object of the particular object type or the data of the particular data type; and providing the indication comprises providing the indication to the analytics system.

In some implementations, the method includes after providing the indication, receiving, from the analytics system, an instruction that triggers use of the action object to perform the action using the object of particular object type or data of the particular data type.

In some implementations, the instruction is provided automatically by the analytics system without user input requesting initiation of the action.

In some implementations, identifying the use of the object of the particular object type or data of the particular data type comprises identifying a reference to the object the object of the particular object type or data of the particular data type in data for a user interface or data for presentation on a user interface; and providing the indication comprises providing the indication for display in the user interface.

In some implementations, the method includes providing, with the indication, data for an interactive user interface element that is selectable by a user to cause the action to be initiated for the object of the particular object type or the data of the particular data type.

In some implementations, the method includes identifying, based on the semantic graph data, one or more conditions associated with the action object; and determining that the one or more conditions associated with the action object are satisfied. Providing the indication is based on determining that the one or more conditions associated with the action object are satisfied.

In some implementations, providing the indication comprises providing the indication for output over a natural language interface.

In some implementations, providing the indication for output over a natural language interface comprises providing, as the indication, a message for output by synthesized speech audio data that indicates the availability of a voice command for initiating the action.

In some implementations, the method includes identifying, based on the semantic graph data, multiple action objects that represent different actions and that are each associated with the object of the particular object type or the data of the particular data type in the semantic graph; selecting, based on the semantic graph data, a proper subset of the actions represented by the multiple action objects; and providing indications of only the actions in the selected proper subset.

In some implementations, the one or more computers are part of an analytics system, and the action is an action performed outside the analytics system.

In some implementations, the one or more computers are part of an analytics system, and the action is an action performed by the analytics system.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 4 is a table that illustrates examples of data defining characteristics of action objects.

FIG. 5 is a diagram that shows an example of a user interface that shows actions identified based on connections with action objects in a semantic graph.

Like reference numbers and designations in the various drawings indicate like elements.

DETAILED DESCRIPTION

Figure 1:
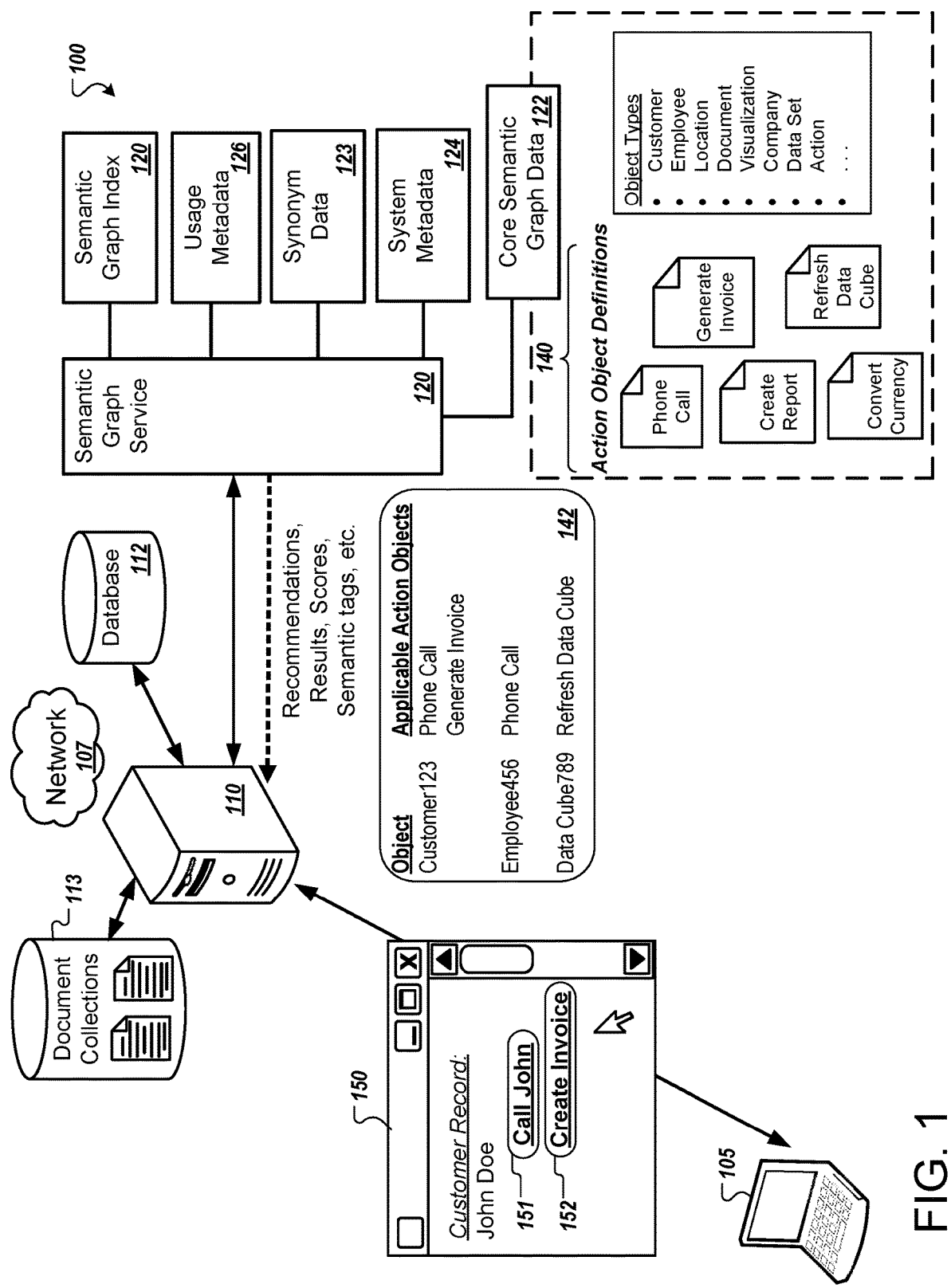
FIG. 1 is a diagram showing an example of a system using action objects in a semantic graph.

FIG. 1 is a diagram showing an example of a system 100 using action objects in a semantic graph.

In general, semantic information can be used by many types of enterprise systems, such as database systems, online analytical processing (OLAP) systems, search engines, and others. Traditionally, semantic data is used to translate database table and other data formats into human-readable forms. Semantic data can provide information about the identity of objects, the meaning of different objects, relationships among objects, and so on. For example, semantic information may indicate that a particular column of data represents a particular attribute or metric and may indicate the data type of the data. Semantic data that indicates the categories or types of objects is useful, but labels and classifications alone typically do not indicate the full scope of the complex interactions, relationships, and histories among objects.

In general, the semantic graph provides an ability to better provide personalized, contextualized information from what otherwise may be a sea of static and flat data without the semantic graph and associated metadata. A semantic graph can indicate enhanced relationships between objects. For example, the semantic graph can include different weights for connections between objects, and the values of the weights can vary dynamically over time. In addition, the semantic graph may indicate multiple different types of connections between objects, as well as specifying directionality of the connections.

The semantic graph and associated metadata can be used to automatically generate personalized recommendations and content to end users, for example, based on the identity of the user and the user's current context. The semantic graph can be used to associate objects with telemetry information, such as usage information that indicates how objects are used, how often objects are used, who the objects are used by, and so on. The relationships modeled with the semantic graph can be varied and complex. Even for only two objects, there may be a multi-dimensional connection between them with different weights representing strengths of different relationships or properties. In this sense, there may be multiple connections between objects representing different types of relationships or different aspects of a relationship (e.g., one weight for co-occurrence frequency in documents, another weight for a degree that one object defines the meaning of the other, another weight for how commonly objects are accessed by the same users, and so on). The weights for the connections dynamically adjusted over time. With this information, applications can better identify which objects out of a large set (e.g., thousands, millions, or more) are most important and most related to each other.

Many different types of objects can be identified and characterized using the semantic graph. For example, objects may represent data sources, data cubes, data tables, data columns, data fields, labels, users, locations, organizations, products, metrics, attributes, documents, visualizations (e.g., charts, graphs, tables, etc.), and many other items and concepts.

Usage information can be stored for each object, as well as for each user. The semantic graph may be interpreted differently for each user. For example, the user context (e.g., the identity, permissions, and usage history for the current user) can provide a personalized lens to interpret the data. User information can be used to adjust the weights in the semantic graph to alter search results, recommendations, application behavior, and other aspects of the user's experience. As discussed below, other types of context can also be captured and stored, such as data indicating a user's geographic location, the identity of a user's device, a device type or capabilities of the user's device, a time of day, an identity of another user or device nearby, an application open on the user's device, text on a user interface, a current task or workflow, keywords of recent queries or recently viewed documents, and so on.

The semantic graph can also indicate weights for levels of security, access restrictions, and trust for objects. For example, the semantic graph data can indicate the status of certain objects being certified or not, as well as the level of certification and the authority that provided the certification. Certified content is often more useful than content that is not certified, and so application content can give higher weight or higher preference to certified content. In general, the connections and weights for the semantic graph can indicate higher weights for higher-quality content.

The semantic graph provides a framework to integrate various different types of data from different sources, e.g., presence data indicating locations of users, access control data indicating user privileges, real-time application context, user interaction histories, query logs, and so on. Further, the relationships between objects are not limited to a particular use or domain. For example, the usage information and history that is generated from user-submitted search queries and responses can affect the weights between objects used for much more than carrying out searches, e.g., also for personalizing an interface for document authoring, for system performance tuning, for recommending documents, and more.

The semantic graph, through the various associated weights for connections between objects, provides a very useful way for a system to understand the relative association between objects. In many cases, the meanings of different items and their relative importance is revealed over time through usage information, such as the frequency with which that users use certain objects together in document or a particular visualization. The overall amount of use of different objects (e.g., number of accesses over a period of time) is also a strong signal that can be used to rank objects relative to each other.

As users interact with an enterprise platform, they contribute information and meaning to the semantic graph. As an example, a database may have a column labeled "EFTID," and the user may know that values in the column represent a unique customer unique ID. The system obtains new information about the meaning of the column as the user interacts with the data, for example, by renaming the column, referencing the data in a visualization, using the data in an aggregation or along an axis, etc. The understanding and context that the user has (e.g., by understanding the meaning of the data) can be at least partially revealed to the system through the user's use of the data over time. The system uses the usage data to capture these indications of meaning and feeds them back into the graph, e.g., through adjusting connections between objects and adjusting weights for connections. A number of contextual cues from user actions can be identified by the system and used to update the semantic graph and optimize the operation of the system.

Information in the semantic graph and associated metadata can be stored on a user-by-user basis and/or at other levels of aggregation (e.g., by user type, by organization, by department, by role, by geographical area, etc.). Usage information is often stored on a per-user basis to indicate the particular actions users take and items viewed. Users can also be grouped together and their respective usage information aggregated. For example, users may have data in the semantic graph indicating their attributes, such as their organization, department, role, geographical area, etc. The system then uses that information to determine the overall usage patterns for a group of users. For example, to determine usage patterns for users in a particular department, the system can identify user objects in the semantic graph that have a connection of a certain type (e.g., a "member of" connection) to the particular department. With this set of users, the system dynamically combines the sets of usage data for the individual users identified. In this manner, the system can aggregate usage logs, system performance data, and other information at any appropriate level as needed.

Action objects in the semantic graph provide the ability to associate an action that can be performed with elements in the semantic graph. Unlike some other types of objects that may primarily specify the properties or meaning of a data item or a physical object, the action object can represent the opportunity to initiate an action. The action object and its connections in the semantic graph can specify when and how the action can be initiated, e.g., under what conditions the action should be made available for a user or computer system to invoke. Each action object can represent a set of one or more actions that the analytics system can initiate. Depending on the type of action and the arrangement of the action object, the action may be performed by the analytics system alone or in cooperation with other systems, and with or without user input initiating the action.

Each action object can have connections in the semantic graph to semantic graph elements or element types, for example, attributes, dimensions, facts, measures, metrics, objects, data types, etc. An action object can be defined to operate on or with data of specific data types, or more specifically with data of certain data types with specific semantic meanings or contexts. For example, one action object may be configured to operate in connection with any semantic graph element representing a phone number or having a phone number as an attribute, to allow a call to be made to any phone number. A different action object may also be configured to operate in connection only with a phone number data type that semantically represents a phone number of a cellular phone, to allow a SMS text message to be sent. As another example, an action object may be configured to operate in connection with a phone number data type that represents a phone number of an employee of a specific company, so that information customized for that company is provided.

The inputs or prerequisites needed for an action object to be invoked can be represented through certain types of connections in the semantic graph. For example, for a "phone call" action object that represents initiating a phone call, an input-type connection may be made with "phone number" attributes. This can signify that the "phone call" action object can be invoked to perform its action whenever a "phone number" attribute is present. This type of semantic graph connection will not be provided to objects in the semantic graph that do not represent or have the needed "phone number" attribute, signifying that the "phone call" action object should not be indicated available for those other objects.

In some implementations, an action object may return a value as output when invoked. The data type of the output, the semantic meaning of the output, and the recipient(s) of the output can be specified with an output-type connection in the semantic graph. For example, a data conversion action object may have various input-type connections that indicate different data types or data sources that the action object can convert. The data conversion action object may have one or more output-type connections that indicate the data type of the converted output and what objects or system elements receive the converted output.

In the example of FIG. 1, a server system 110 provides analytics functions to a client device 105. The analytics functions can include serving documents, answering database queries, supporting web applications, generating documents (e.g., reports, dashboards, etc.), and so on. The server system 110 can include one or more computers, some of which may be remotely located or provided using a cloud computing platform. The server system communicates with the client devices 105*a*-105*e* through a network 107.

The server system 110 has access to a database 112 that stores data that is used to provide the analytics functions. For example, the database 112 may store documents, data sets (e.g., databases, data cubes, spreadsheets, etc.), templates, and other data used in supporting one or more analytics applications. The information in the database 112 can be stored as structured data, semi-structured data, unstructured data, or in any appropriate form. The server system 110 may additionally or alternatively access document collections 113, which can include documents created, accessed, edited, or otherwise used by users of the system. In some implementations, the documents may be served by the server system 110 or a related server.

The server system 110 stores data for a semantic graph, which can include, among other data, a semantic graph index 120, core semantic graph data 122 (e.g., including object definitions, semantic tags, identifiers for objects and connections, etc.), system metadata 124, and usage metadata 126. As shown in FIG. 1, the core semantic graph data 122 can include definitions for action objects 140. For each action object, the data 122 can indicate the associated semantic graph element(s) with which the action object can be invoked to perform its associated action. For example, the data 122 can indicate the input that an action object needs to receive to carry out its assigned function or operations. The association can be defined in any of various ways, as discussed further below with respect to FIGS. 2-6.

The system may be arranged to provide access to the semantic graph through a semantic graph service 120. For example, the system may provide an application programming interface (API) allowing software modules to look up different information from the semantic graph. The semantic graph and associated metadata can be stored in various formats. As an example, a core set of structured metadata identifying objects and their properties can be stored in a database. Additional associated data can be stored in the same manner or at other locations. For example, a high-speed storage system can store and update usage metadata, system metadata, and other types of information that are constantly being updated to reflect new interactions. This metadata can be associated or linked to the core structured metadata for the objects by referencing objects through the identifiers or other references defined in the core semantic graph structured metadata. The semantic graph service 120 may then provide information to influence various other functions of the enterprise system, such as a search engine, a content recommendation engine, a security or access control engine, and so on. Although the storage of the semantic graph data and associated metadata may be stored at diverse storage locations and across different storage systems, the semantic graph service 120 provides a unified interface for information to be delivered. Thus, the service 120 can provide access to diverse types of data associated with the semantic graph through a single interface. The semantic graph service 120 can provide a consistently available, on-demand interface for applications to access the rich interconnectedness of data in an enterprise system.

As an example, a query response engine can submit a request to the semantic graph service 120 that indicates a certain context. The context information may indicate, for example, user context (e.g., a user identifier), location context (e.g., GPS coordinates or a city of the user), application context (e.g., a document being viewed), or other contextual factors. In some cases, the request indicates one or more context objects (e.g., user objects, location objects, document objects, etc.) and the semantic graph service 120 provides a list of the related objects and scores of how relevant the results are to the context objects. If a recommendation engine submits a request for results of a certain type (e.g., documents, media, etc.) given a certain context, the semantic graph can provide results that identify objects selected based at least in part on the particular usage history and other data associated with the context. The semantic graph service 120 may use both general weights and usage information, e.g., across all users, as well as specific weights and usage information tailored to the context. For example, all using data may be used to define a general weight that is used for a connection in the semantic graph when no specific context is specified. When a user context is specified, the general weight may be adjusted based on user-specific usage data and weightings. Thus the results from the semantic graph service 120 can blend general and context-specific information when appropriate. Of course, if specified in a request or for certain types of requests, responses for a context may be generated using only metadata relating to the context in some implementations.

Some requests to the semantic graph service 120 can request the identification of objects that satisfy certain criteria. For example, a query may request a set of objects that are relevant to a context, topic, and/or keyword indicated by the query. The semantic graph service 120 can respond by providing identifiers and other information for matching objects in the semantic graph. Another type of query to the semantic graph service 120 can be a request for information about one or more objects. For example, the query can include an identifier for an object, and in response the semantic graph 120 can provide information about the properties of the object and its relationships to other objects.

For any of the various types of queries to and responses from the semantic graph service 120, information about relevant action objects can be provided. For example, when providing a list of objects as search results, the semantic graph service 120 can also indicate actions available for the respective search result objects through action objects. The server system 110 may use the indicated set of available actions to generate or adjust content provided to the user. For example, the server system 110 may: generate user interface data to provide controls enabling a user to initiate performance of the available actions; group or categorize search results according to which actions are available; rank search results according to which actions are available; and/or generate content to be provided with the search results by the server system 110 invoking one or more of the available actions. In a similar manner, when a query requests information about a specific object or requests a recommendation of an object, the data returned by the semantic graph service 120 can also indicate the actions indicated available by semantic graph connections to action objects.

Referring still to FIG. 1, there are a number of action objects 140 defined in the semantic graph data 120. These action objects 140 respectively correspond to actions such as a phone call, creating a report, converting a currency value, generating an invoice, and refreshing a data cube. These action objects 140 operate in connection with different types of elements defined in the semantic graph, as discussed further with respect to FIG. 4.

In FIG. 1, the server system 110 identifies a need to provide information to the client device 105. This may occur in response to a query from the client device 105, access by the client device 105 to a user interface or application, a process of the server system 110 determining a recommendation of content is appropriate, or other processing. As the server system 110 generates output data for the client device 105, the server system 110 requests information from the semantic graph service 120 about objects that are used to generate the output or are represented in the output.

The semantic graph service 120 uses the semantic graph data 122 and other types of metadata to provide a response. Among other operations, the semantic graph service 120 can identify which action objects 140 are associated with the objects used by the server system 110, and thus the types of actions available for each of the objects the server system 110 is using. This is illustrated with action data 142, which can represent the results of a dynamic, just-in-time analysis of the connections in the semantic graph.

For example, having received information that a customer object "Customer123" is among the set of objects used by the server system 110, the semantic graph service 120 analyzes the semantic graph data 122 and determines that the customer object has attributes that are associated with the "phone call" action object, as well as the attributes associated with the "generate invoice" action object. As a result, both the phone call action and the generate invoice action will be indicated as available for the customer object. As another example, the employee object "Employee456" is determined to include an attribute associated with the "phone call" action object, but is not associated with semantic graph elements connected to the other action objects 140. In addition, the semantic graph service 120 determines that the data cube object "DataCube789" satisfies the criteria for the "refresh data cube" action object to be invoked. The semantic graph service 120 returns the action data 142 to the server system 110.

With the action data 142, the server system 110 generates output data to be provided to the client device 105. In the example of FIG. 1, this includes data for a user interface 150 to be generated and presented by the client device 105. The server system uses the action data 142 to generate user interface controls 151, 152 that a user can select to initiate the corresponding actions. For example, interacting with a button 151 can initiate a phone call to the customer whose record is shown on the user interface 150. As another example, interacting with a button 152 can initiate the creation of an invoice for this customer.

Significantly, the particular controls 151, 152 are not hard-coded into the output generation process for the user interface 150. The actions that can be initiated using the controls 151, 152 do not need to be specifically registered with customer object "Customer123" or with the customer object type generally in order to make the actions available. Rather, the server system 110 can dynamically insert the controls 151, 152 into the page (or another interface) based on a query to and response from the semantic graph service 120, which indicates the currently available set of actions for the specific objects involved in generating the user interface 150. This technique allows the server system 110 to make any interface or data set actionable by a user, through the semantic graph connections to the action objects 140. The server system 110 can generate or adjust the data provided to any of the client devices it serves based on the actions that the semantic graph service 120 determines to be available due to semantic graph connections with action objects.

Once an action object is defined, it can be associated with an attribute, metric, data type, or object. In general, this allows any object of any type to accepted and recognized as supporting the action of the action object, as long as the associated attribute, metric, data type, or object is present. Actions of the action objects do not need to be registered with specific objects or object types to be able to be invoked. Instead, the action object can simply specify criteria (e.g., a data type or an object representing a type of data), and all objects that meet the criteria become able to support the action of the action object. Later-created objects and new object types also are also automatically able to support the action and can have the action recommended as an option, without any registration process needed. This can greatly enhance the ability of users to take action using objects in the semantic graph, as the system can propagate any and/or all of the appropriate actions for objects that support the actions. For example, if an action object is associated with a phone number, any object having a phone number defined can support the action, whether the object represents an employee, a building, a company, etc. This allows the action of the action object to be linked to any appropriate object and object type, without needing to manually set or maintain the list of objects and object types that are applicable. In fact, if a new object type is defined that includes a phone number attribute, the action of the action object that operates using phone numbers can be associated and made available, without the new object type and the action object ever being specifically linked.

As data of the semantic graph changes, and as the set of action objects changes, the available set of actions that can be performed changes. As a result of these changes, new sets of actions that are indicated to be available can be dynamically generated or changed. For example, some action objects can be configured to perform an action for objects that have a phone number listed. After an object type is updated to include a phone number field, or when individual objects without a phone number listed have a phone number populated, objects that previously could not be used to perform the actions will be determined by the system to be able to support the actions. Similarly, objects that had a phone number but the phone number is then deleted would be shown to no longer support the action. As another example, action objects can be added, removed, or edited which can also trigger changes in the sets of objects they apply to, and thus the sets of actions that are indicated for those objects.

The action objects and the system's ability to dynamically determine which actions are available can be used for many different types of interfaces. The actions defined by action objects can be exposed for users to see as options and to initiate for any interface of the system. One example is visual interfaces such as graphical user interfaces for web pages, native applications, web-based applications and so on. For these interfaces, controls such as buttons, drop-down lists, menus, and so on can be added or populated with actions that can be initiated for objects that the system determines to be relevant to the current context (e.g., the current UI view, topic, task, application, etc.). Another example is text-based interfaces, such as messaging platforms, social media platforms, and chat platforms. The system can indicate in natural language form a set of available actions and receive instructions and requests in natural language to initiate the actions. Another example is voice-based interfaces, such as digital conversational assistants and other natural language voice response interfaces. The system can cause synthesized audio to be generated and provided to a client device for output. The synthesized audio can indicate contextually relevant objects and actions available to be performed for the objects, and the system can accept requests to initiate the actions made using voice input. Another example is application programming interfaces. For example, some action objects may represent functions that a computer system can invoke using an API. The server system 110 can provide data to other computer systems to indicate, for a particular object, object type, or set of objects, the set of actions that can be performed via APIs using the actions specified by action objects. The server system 110 can also respond to API requests that cause the actions represented by action objects to be performed.

The semantic graph and the action objects can support various types of interactions. For example, a user may submit a natural language query, by voice or text, to the server system 110, e.g., "Who is the top-performing sales person this year?" In response, the server system 110 can use one or more databases to determine the answer, and then reply, e.g., "The top-performing salesperson is Joe." The user may ask what actions are available, e.g., "What can I do with Joe?" The server system 110 then uses the semantic graph and the action object data to determine what actions are available for the user object representing user "Joe." The server system 110 may then respond with a list of available actions, e.g., "For the user Joe, you can issue a promotion, initiate a phone call, send a message, or request termination." The set of options provided can be personalized based on the identity of the user communicating with the system. For example, some actions may only be indicated and/or available to initiate when the user has sufficient permissions, or is in a particular department or role in a company. The semantic graph and authentication data will be used to verify the set of actions that are appropriate and the response of the system will be tailored accordingly. Each of the different actions provided as options may correspond to a different action object. However, in some implementations, a single action object may provide multiple different actions, or an option provided to a user may involve the actions of multiple different action objects. The various actions may initiate different workflows that can communicate or interact with various other systems. For example, the user may reply, e.g., "Issue a promotion to Joe," which may cause the server system 110 to carry out the action(s) that are specified by an "Issue Promotion" action object. The set of actions may involve further interactions with the user, for example, to specify the level of promotion, the new title, a change in compensation, and so on. In this manner, may different common actions for users in many different roles can be defined as action objects, allowing the actions to be initiated by a variety of different users.

Figure 2:
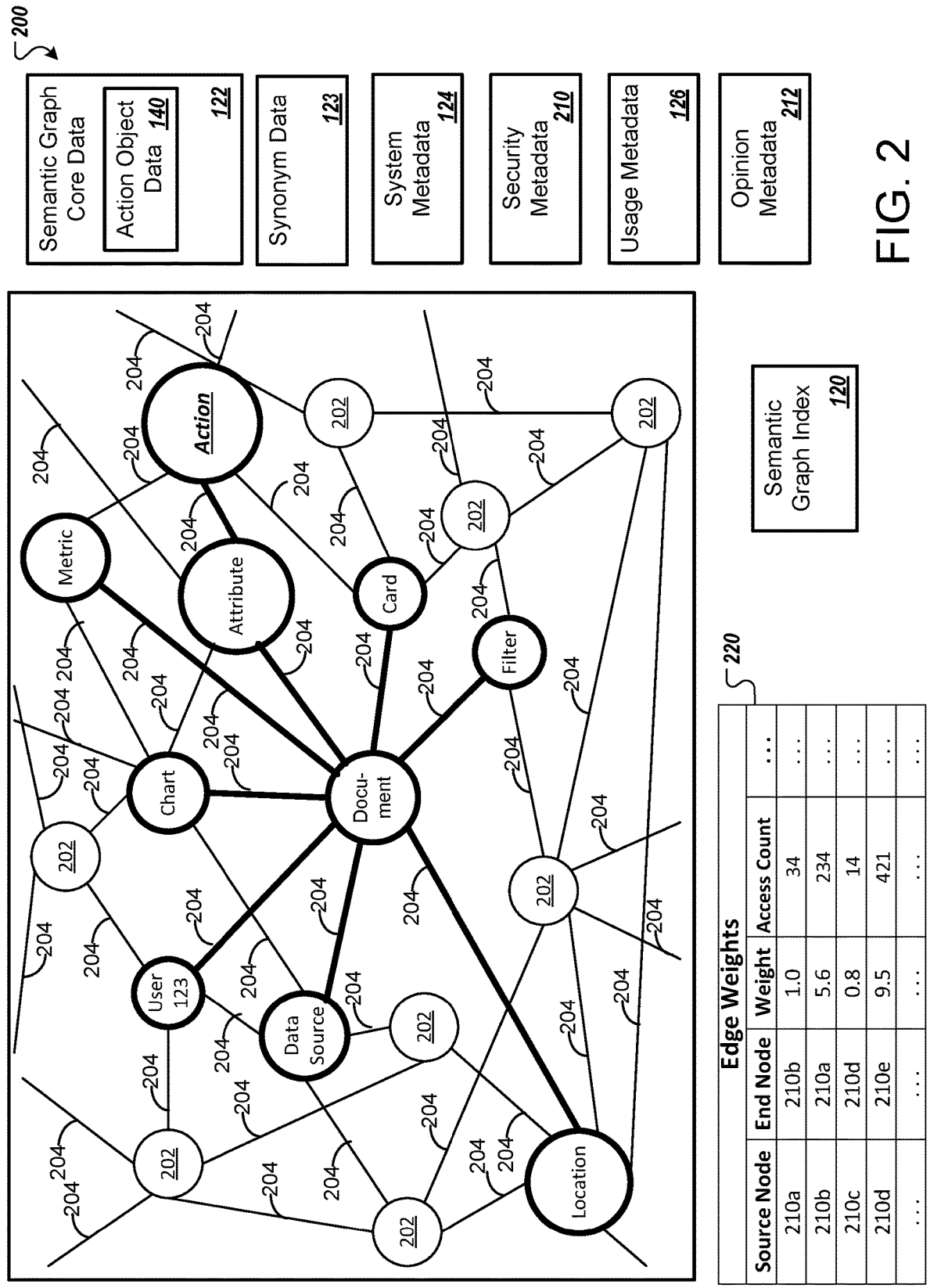
FIG. 2 is a diagram showing an illustration of a semantic graph.

FIG. 2 illustrates an example illustration of a semantic graph 200. Objects are illustrated as nodes 202 and relationships or connections between the objects are illustrated as edges 204. Each node 202 can have a variety of information stored to describe the object it represents, e.g., an object type for the object, a location of the object (e.g., in a file system), an identifier for the object, attributes for the object, etc. The nodes 202 and edges 204 that identify the objects and their connections may be stored in the semantic graph core data 122, along with definitions, semantic tags, and more.

The edges 204 have weights 220 associated with them, e.g., values indicating magnitudes or strengths of the respective connections. Other information indicating the nature or character of the edges 204 can also be stored. Although the illustration only shows one edge 204 between each pair of nodes, there may be multiple different relationships between two objects, which may be represented as, for example, multiple edges 204 with different weights or an edge with multiple dimensions or aspects. In some implementations, an edge 204 and an associated weight represents an overall affinity of objects. In some implementations, Different edges 204 may represent different types of relationships, e.g., dependency (e.g., such as a document requiring data from a data source), co-occurrence, an object being an instance of a class or category, an object being a part of another object, and so on. Edges 204 may be directional. For example, the weight or strength of connection from Object A to Object B may be greater than the weight from Object B to Object A.

The semantic graph 200 has various types of metadata that describe aspects of the objects and connections. The system metadata 124 can indicate the configuration of the system and performance measures. This metadata can be generated and stored for each device or module of an enterprise system, e.g., client devices, content servers, database servers, individual applications, etc. The usage metadata 126 can include records of the accesses made throughout the system to any of the objects represented in the semantic graph 200, as well as the nature or type of access. Security metadata 210 can indicate security policies, permissions and restrictions, histories of security decisions (e.g., to grant or deny access) and so on. The Opinion metadata 212 can indicate explicit or inferred opinions and preferences of users. For example, the opinion metadata 212 can store information about sentiment derived from user actions or user documents, preferences for some items over others, and so on. These types of metadata and others can be associated to identifiers for specific nodes 202 and connections 204, allowing the semantic graph to store information about specific instances of how nodes 202 and connections 204 were accessed.

The system metadata 124, usage metadata 126, and other types of metadata can be log files that show historical information about how an enterprise system operated and how it was used. In some implementations, the metadata is received as real-time or near-real-time telemetry that is measured, logged, and reported as transactions occur. For example, the metadata can collect and store a stream or feed of information from client devices, databases, query processing modules, web servers, and any other component of the enterprise system. Thus, the information can be used to detect performance limitations or emerging trends in usage as they occur and with a very fine-grained level of precision. The telemetry can indicate individual requests, transactions, and operations. In some implementations, some aggregate measures can also be provided, such as an overall load level of a device.

As discussed above, a semantic graph can be a logical layer of software that describes information stored in data systems using human-readable terms and provides metadata that can aid analysis of the data. One of the primary functions is to provide people with way to query databases using common business terms without having to understand the underlying structure of the data model.

A semantic graph can store or have associated with it (i) metadata describing the data in human-understandable terms along with (ii) usage data about how often the data is accessed, by whom, and relationship data about how objects are used together in analysis scenarios. There are a number of objects and metadata that may be stored as part of a semantic graph implementation: data objects, content objects, user objects, usage metadata, security metadata, system metadata, a semantic graph index, opinion metadata, and action objects.

Different vendors often different terminology for similar concepts. For example, a "dimension" or "attribute" for a data object may both represent the same or similar concept, e.g., a value that represents a property of a data object. Similarly, a "measure" or "metric" in a data set may both refer to the same or similar concept, e.g., a value that provides quantitative indicator, such as a result of a calculation or function.

Data objects in the semantic graph can refer to objects that appear to users as business concepts. For example, "customers", "products", "revenue" and "profit" are all common data objects in the semantic graph. A user will typically see those data objects in a user interface and can query the underlying database by interacting with the data objects. For example, a user may query the database by requesting "customers" and "revenue". The system will then query the database (or in many cases, multiple databases) to fetch the customer revenue data. Querying the system usually requires a number of complex database calls using SQL, MDX or APIs. From a user perspective, however, the complexity of how the data is stored, and the sophisticated query required to retrieve the results are automatically handled on behalf of the user.

Common types of Data objects include dimensions, measures, groups and sets, hierarchical structures, filters and prompts, geographic objects, date and time objects, and synonym objects. Dimensions (Attributes)—Dimensions and Attributes both refer to data that is typically (but not always) a noun, such as "Customer", "Product", "Country", or "Account". Dimensions can also have additional metadata associated with them to qualify them further. For example, a Dimension object can have further metadata describing it as a Person, which can, in turn, have further metadata describing the Person as being of type Employee.

Measures (Metrics or Key Figures)—Measures and Metrics both refer to data that would typically be used for calculations such as "Revenue", "Profit", "Headcount", and "Account Balance". Measures can also have additional metadata further describing how the Measure behaves. For example, additional metadata can describe whether bigger values or smaller values are "good" or whether a Measure represents a "currency".

Groups and Sets—Groups and Sets refer to objects in the semantic graph that represent grouping of data elements. For example, the "Top 10 customers" may be a group that represents the top Customers by some measure (for example Revenue). Groups and Sets can be a simple grouping such as "My Customers=Company 1, Company 2, and Company 3" or a rules-based grouping such as "My Top Customers=top 10 Customers by Revenue for Year=2018".

Hierarchical structures—Hierarchical structures provide metadata about the relationship between objects and object values in a semantic graph. For example, one such hierarchical structure may describe a Parts hierarchy where certain products are made up of parts.

Filters and Prompts—Filter and prompt objects provide a means to define variables that need to be set either by the programmer, system or end user prior to execution of the object. For example, a semantic graph may have a "Region" filter or prompt whose value must be defined prior to executing the query or content object that it is associated with.

Geographic objects—Geographic objects are objects associated with geographic concepts such as countries, regions, cities, latitude and longitude. Geographic metadata helps the consuming user or system map or perform geospatial calculations using the objects much more easily.

Date and Time objects—Date and Time objects are a special classification of objects that are associated with Dates and Times. This can be used for time based calculations (year over year analysis) or for displaying the object data on Date and Time-based output such as calendars.

Synonym objects—Synonym objects are a special classification of dimension and attribute objects that store alternate values to the values in the dimension objects. This is useful in cases where there are multiple common terms that are used to map to a specific value in the database. For example, in common usage, Coke and Coca-Cola are often used interchangeably when searching for information. The Synonym object stores such alternate values and maps them to a common value in the database. An example of a synonym object is shown in FIG. 3C.

Content objects in the semantic graph refer to content that is typically displayed to end users as an assembly of data objects. Content objects include:

Reports—Report objects are highly formatted, sectioned and paginated output such as invoices, multi-page tables and visualizations.

Dashboards—Dashboards objects are similar to Report objects in that they also display data and have formatting and visualizations. Dashboards differ from Reports in that they tend have summary data and key performance indicators instead of detailed pages of information.

Tables and Grids—Tables and grids represent data in tabular format (with rows and columns). Tables and grid often are included in Reports and Dashboards.

Visualizations—Visualization objects illustrate data in charts such as bar, pie and line charts.

Cards—Card objects store the key information for a specific topic and are built to augment and overlay third party applications with analytic information in the context of the user.

Users—User objects describe people, groups, and organizations that are represented in the semantic graph. These objects represent user accounts and groups of user accounts and are used to provide system access, security and rights to other objects in a semantic graph. Users are particularly important in the semantic graph because they are the actors in the system that create, interact with, and use the other objects in the semantic graph. A semantic graph provides an understanding of the relationship between users and the objects in the semantic graph as well as the relationships between the users themselves.

Privacy—Privacy objects can define various aspects of how data or objects in the semantic graph are accessed, presented, viewed, or otherwise used. Privacy objects may be objects that represent policies or rules that define how various other objects or groups of objects can be. As another example, privacy objects may represent limitations or access restrictions, and the association or connection of the privacy objects to other objects in the graph may specify which objects the limitations apply to.

The weights for connections to privacy objects may be used to specify required levels of authentication or permission needed to access an object or data (e.g., a document, a user profile, or a database record) the object represents. For example, a privacy object having with a connection weight of zero with a document object may allow unrestricted access to the document. The privacy object having a connection weight of one with the document object may require authentication of a user before access to the document is allowed. The privacy object having a connection weight of two with the document object may require an authenticated user and a certain set of permissions to allow access to the document. Similarly, other connection weights to the privacy object, or connections to other privacy objects and/or the content of the privacy objects, may cause restrictions in an analytics system on the type of access (e.g., read only, read-write, etc.), the location(s) where access is allowed, the time of access (e.g., time of day, day of the week, date, etc.), the duration of access, whether access is permitted in the presence of others, a whitelist or blacklist for who can obtain access, the form of output (e.g., on mobile devices vs. desktop computer access, visual vs. audible output, etc.), and in general any type of restriction on the manner or extent of use.

Usage metadata is information stored in a semantic graph about the usage of the objects in a semantic graph. This additional usage data provides information about which objects are used by which users, which objects are used together and which objects are the most and least popular in the system. Usage metadata also contains the context of the user when she interacted with the system. For example, what type of device she was using, where she was, and what data context she was in. This usage metadata, in addition to the other metadata in a semantic graph, provides a means to find relevant information for different users and usage context. Usage metadata is the primary differentiator between a semantic layer and a semantic graph. While a semantic layer primarily describes data in business terms and provides relationship information between the objects as a means to map these business terms to database queries, a semantic graph stores usage information to provide additional information about the weight of the relationships between objects in the semantic graph. Usage metadata can also contain information about when and where objects are accessed.

Security metadata is information stored in a semantic graph about which users have access to which objects, which privileges they have on the objects, and which data they have access to. The Security metadata can also contain special concepts such as whether the objects are certified, contain personally identifiable information or contain sensitive information.

System metadata is data about how the objects in the system perform. This can include system information such as error rates and run times for the objects. This information can be used by users and system processes to optimize performance of the system. For example, the system can automatically notify content authors if their content is experiencing slow load times or high error rates. The system can also use the system metadata in the semantic graph to automatically perform maintenance to improve performance of content. For example, if a content object has slow performance and there are many users that access that content on a predictable basis, the system could potentially automatically schedule execution of the content and cache the results so as to provide users with improved performance.

A semantic graph index indexes key values in the semantic graph so as to provide fast search and retrieval times. These key values may be a variety of types of information, such as keywords, semantic tags, object or node identifiers, connection or edge identifiers, and so on.

Opinion metadata is opinion information about the objects in a semantic graph that is provided by the end users. For example, users could give a 'thumbs up' or 'favorite' content to indicate that they like or find it useful. Other mechanisms such as a star system or commentary can also be employed as means of storing opinion metadata in a semantic graph. Opinion metadata is useful alongside usage metadata and affinity between objects to help find content that is both relevant to the user's context and of value based on opinion.

Action objects describe actions that can be taken on other objects in a semantic graph. For example, there may be an Action object that takes a Date and Time object and converts it from one format (24 hour) to another (12 hour).

A semantic graph can provide a number of benefits. For example, a primary goal of the semantic graph is to make access to complex business data systems easy for people without database or programming skills. The semantic graph can provide common naming and semantics to represent complex data models with otherwise obscure or non-human-readable names. The semantic graph can provide or support various services built atop it (for example, search or machine-learning-driven recommendation services) with metadata, relationships, and user-based context information that can help answer user questions and recommend the most relevant content to users. The semantic graph can include (or have associated with it) security and audit information to help secure data assets based on user security access profiles.

Various examples of types of objects that can be represented in the semantic graph are discussed above. Additional object types can also be used. In general, the object of a semantic graph can represent any person, place, thing, concept, or data. The objects can further represent particular semantic meanings of those objects and relationships to other objects. For example, one or more objects may represent individual people or groups of people. Of those objects, some may specify different types of people, e.g., different roles, job positions, relationships (e.g., customer, supplier, consultant, supervisor, etc.).

Figure 3A:
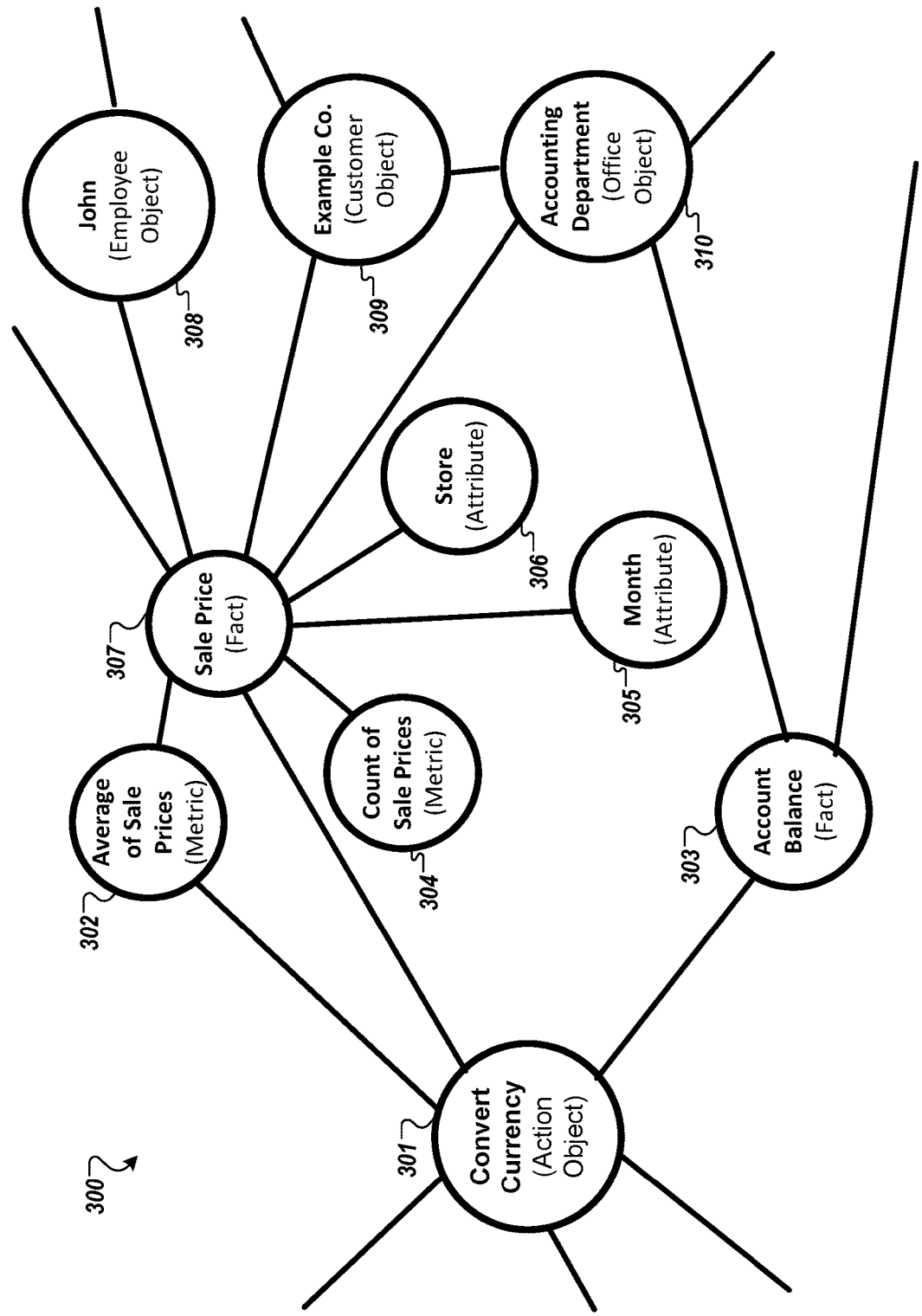
FIGS. 3A-3B each show an example of an action object and a portion of a semantic graph.

FIG. 3A shows an example of a portion of a semantic graph 300 that includes an action object 301. The example also shows various other objects 302 to 310, some of which are associated with the action object 301 in a manner to allow the corresponding action to be performed. Different types of elements in the semantic graph can connected to an action object (e.g., attributes, metrics, facts, etc.) be used to signify whether an action is available.

The action object 301 represents a currency conversion action that receives a value denominated in any of a set of one or more currencies and converts to a value denominated in different currency. The semantic graph 300 shows connections between objects 302, 303, and 307 with the action object 301, indicating that the currency conversion action can be invoked for any of these objects 302, 303, 307. The object 307 represents a sale price for an item. This price is represented as an object in the semantic graph, and more particularly a fact or value. The object 307 has the appropriate data type needed as input to the currency conversion action and so supports the action. Other related objects do not allow for the action to be performed and are not connected to the action object 301, or are connected with a connection type or weight that indicates that the action is not available. For example, the metric object 304 indicating a count of unique sale prices provides an integer value, not a currency value as needed to perform the action represented by the action object 301. Similarly, the object 305 indicating a store where the sale occurred, and the object 305 representing the month when the sale occurred also do not allow the action to be performed, and are not connected to the action object 301. On the other hand, the object 302 is a metric or measure that represents an average of sale prices, and this average is a currency value. As a result, the object 302 is connected to the action object 301 to show that the action can be performed for the object 302.

Action objects can include various types of logic and other functionality to carry out an action. For example, a currency conversion action object can include rules to acquire and assess relevant information when the action object is invoked to perform an action. The rules can determine, for example, if the currency value to be converted is associated with a date, such as the date of a specific transaction, and as a result can look up and use an exchange rate effective as of the date of the transaction. For other uses, however, if no date is associated or if the request applies to a current or future date, the current exchange rate may be used.

Figure 3B:
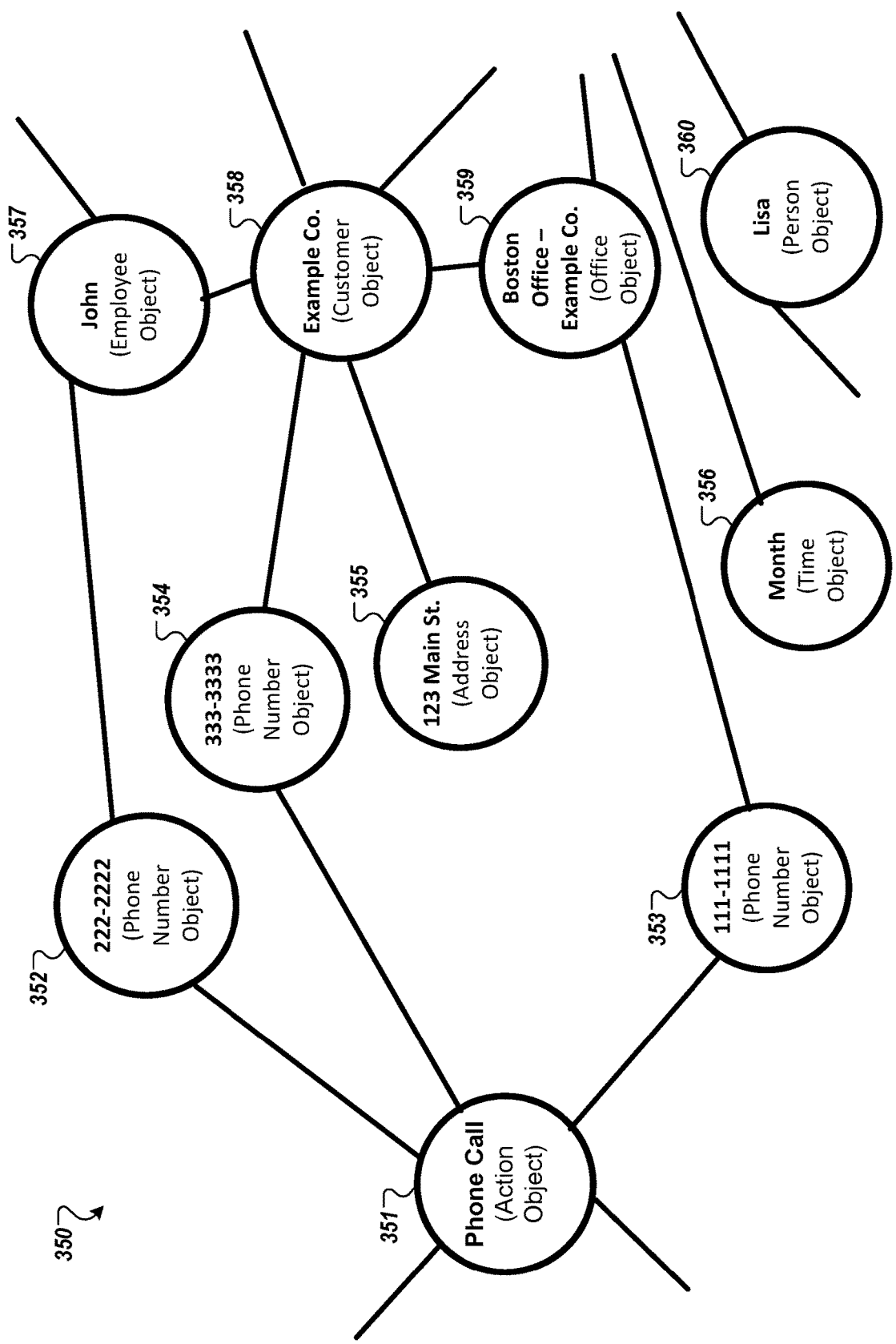

FIG. 3B shows another example of a portion of a semantic graph 350 that includes an action object 351. In this example, the action object 351 represents the action of initiating a telephone call. Objects 352, 353, 354 are each phone number objects representing phone numbers, and so these objects 352, 352, 354 are connected to the action object 351 to show that the phone call action can be performed for them. Other objects, such as a street address object 355 and a time object 356 representing a month do not allow the phone call action to be performed and so are not connected to the action object 351.

The action represented by an action object 351 can be indicated available for objects other than objects directly connected to the action object 351 in the semantic graph. For example, the employee object 357, the customer object 358, and the office object 359 are not directly representing phone numbers and are not directly connected to the action object 351. Nevertheless, each of these objects 357, 358, 359 is defined to have one of the phone number objects 352, 353, 354 as an attribute. In other words, the object type data for employee objects, customer objects, and office objects defines these objects to include a phone number as an attribute, and these specific objects 357, 358, 359 have that attribute populated with a valid phone number object 352, 353, 354. As a result, a semantic graph service can determine that the phone call action is available for each of the objects 357, 358, 359 because they have the attribute type of connection to a phone number object. In the example, there is a person object 360 that also allows for a phone number object as an attribute, but because there is no phone number object defined (e.g., the phone number field is empty or no phone number is available), the lack of a connection in the semantic graph shows that the phone call action is not available for this particular person.

FIG. 4 is a table 400 that illustrates examples of data defining characteristics of action objects. In the table 400, the rows represent different action objects. As illustrated, an action object can have an action object identifier, an action performed, an input type, an output type, and optionally one or more conditions that further define when the action for the action object is appropriate.

For example, the first action object has an identifier of "132" and has the action of performing a phone call. This action requires a phone number, so a phone number attribute is specified as the type of input or input object that the action object should be associated with. The performance of the action will result in a phone call being initiated to the input phone number. The output value shown in the example is a confirmation that the phone call operation was initiated. Generally, an action such as a phone call may be initiated from an analytics system, but occurs outside the analytics system, for example, through an application on a client device. The action object can be associated with instructions, executable code, or other information enabling the action to be carried, for example, to perform an API call to initiate the phone call. In the example, the phone call action is also associated with conditions that limit when the action is provided to a user as being available, e.g., that the user should be using a cellular-enabled device or a device having a voice-over-IP (VOIP) application in order for the phone call action to be presented as an option to the user.

The second action object represented in the table 400, with identifier "6224," represents an action to generate a report based on a particular document object represented by a document object identifier. The output of the action is a document identifier for the generated report. This action is indicated as an option and performed only when the user has permission to access the report.

The third action object represented in the table 400, with identifier "1324," represents an action to generate an invoice based on a particular customer object represented by a customer object identifier. The output of the action is a document identifier for the generated invoice for the customer. This action is only made available to a user when the user has authorization to access the account of the customer represented by the customer object.

The fourth action object represented in the table 400, with identifier "9542," represents an action to convert a currency value to a currency value denominated in U.S. dollars. The action object is able to accept any value that has a currency data type, and outputs a value with a currency data type.

The fifth action object represented in the table 400, with identifier "554," represents an action to refresh a data cube. It can accept as input an object identifier for a data cube, and outputs a confirmation when the action is completed. The action is made available only when the user has permission to edit the specific data cube that is at issue.

FIG. 5 is a diagram that shows an example of a user interface 500 that shows actions identified based on connections with action objects in a semantic graph. The user interface 500 shows a report generated by the server system 110 that has user interface controls 510, 520 added based on connections with action objects in the semantic graph.

In general, each time an object or other data element appears in processing or output of the server system 110, the server system 110 can use the semantic graph service 120 to look up available actions, which the server system 110 may indicate to a user. These actions can determined dynamically by the semantic graph service 120 based on current connections and weightings between objects in the semantic graph, not based on a predetermined registry or mapping. The server system 110 may add an option for performing an available option to a menu, such as a context menu that appears when a user taps, hovers, or right-clicks on an interface. As another example, the action can be indicated in a control shown on screen, such as a button shown adjacent the corresponding data on a user interface. As another example, using a voice interface, a response of a voice interface system can indicate the action as an option or command that the user can invoke.

The user interface includes two visualizations of data from a data cube. When generating the data for the user interface 500, the server system 110 and/or the semantic graph service 120 detect use of the data cube object used to create visualizations. This process may involve evaluating various connections between objects in the semantic graph. For example, the source data used by the server system 110 to generate the visualizations may be analyzed to extract the relevant object identifiers, which can be provided to the semantic graph service 120 to determine if any actions are available. As another example, the elements of the user interface 500, such as the visualizations themselves, may be indicated to the semantic graph service 120. The semantic graph service 120 can evaluate the connections of the visualization objects with other objects to determine that the visualizations are based on the data cube.

Based on semantic graph connections, the semantic graph service 120 determines that the "refresh data cube" action object represents an action that can be invoked for this object type. The server system 110 and/or the semantic graph service 120 determine that conditions for invoking the action are satisfied, for example, the user is determined to have authorization to alter the data cube. In response to determining the connection to the action object and determining that the conditions for invoking the action are satisfied, the server system 110 includes a "Refresh Data Cube" control 510 to the user interface 500, which the user can select to initiate refreshing the data cube and the visualizations.

In this example, the system uses semantic graph objects and relationships to determine what actions are available and what to present to the user. Although nothing explicit in the content even the metadata of the user interface 500 specifies the data cube object, the semantic graph connections allow the system to identify the underlying data cube object and provide options for acting on it.

The server system 110 and/or the semantic graph service 120 also identify a data element having a currency data type. Based on semantic graph connections of the data element, the semantic graph service 120 determines that the "convert currency" action object represents an action that can be invoked for this data element. In response to the determination, the server system 110 adds a user interface control 520 that a user can interact with to initiate the currency conversion action represented by the "convert currency" action object.

Figure 6:
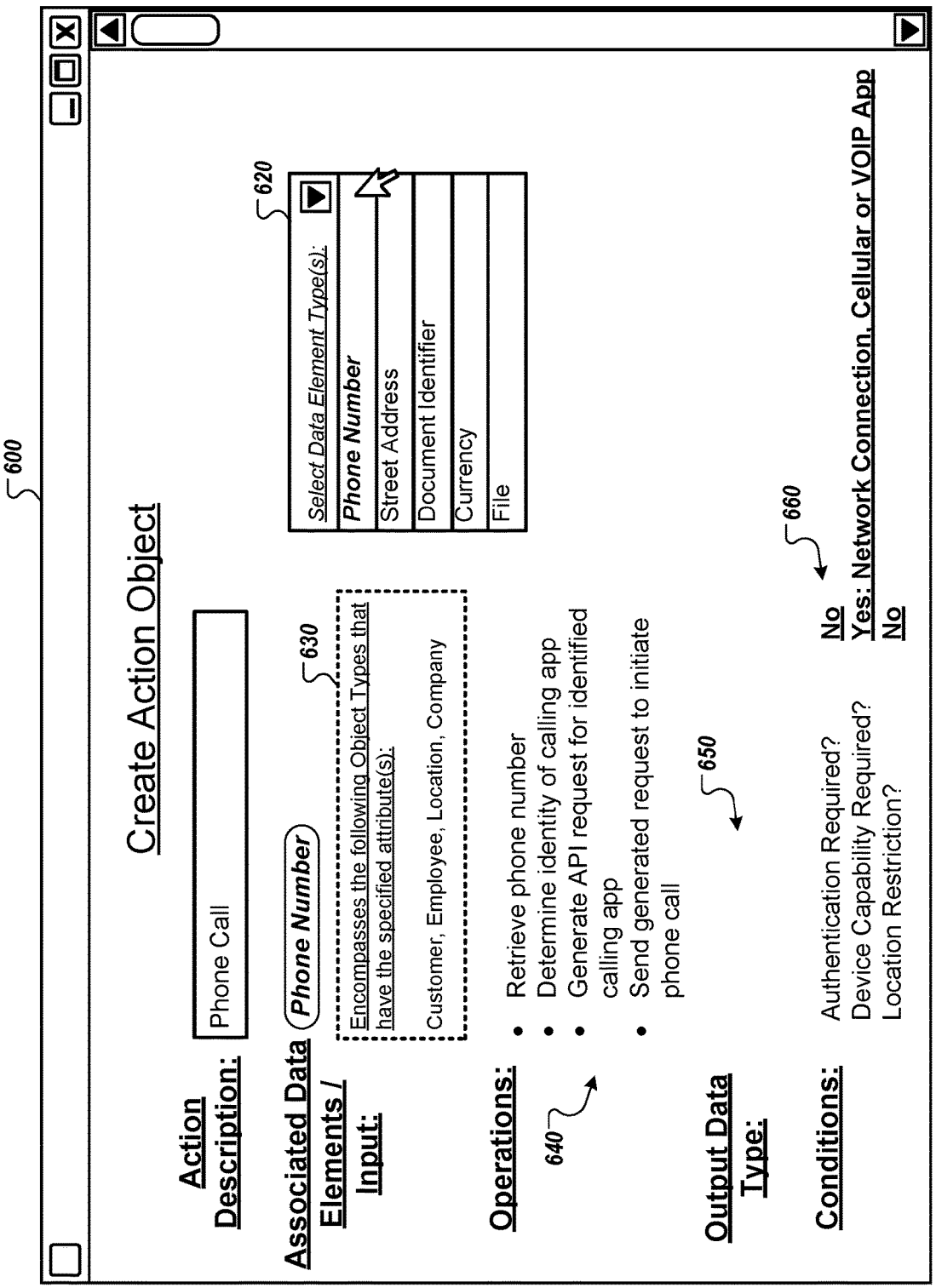
FIG. 6 is a diagram that shows an example of a user interface for creating an action object for a semantic graph.

FIG. 6 is a diagram that shows an example of a user interface 600 for creating an action object for a semantic graph. The user interface 600 includes various fields and controls that allow a user to define characteristics of the action object, such as the types of semantic graph elements the action should be associated with, the action(s) to be performed, and additional conditions that should be satisfied before the action is made available.

In the example, the user enters a name for the action object, "Phone Call," in a field 610. The user then has the option to select from various elements of the semantic graph to specify what the action will act on. These can be any element in the semantic graph, e.g., attributes, metrics, objects, data types, and so on. In the example, the user selects a "phone number" element from a drop-down list 620 to designate this as the element that will trigger the availability of the action. based on the way other objects are currently defined and the connections between them, The user interface 600 shows in region 630 that associating the phone number element with the action object will make the action available for a set of objects including customer objects, employee objects, location objects, and company objects. Whether a specific instance of these object types will have the phone call action available may depend on whether a valid phone number element is actually associated with the object instance in the semantic graph. For example, direct connections between the action object may be formed with phone number elements, and then the action is propagated to other objects that define a phone number element as an attribute. A company object without a phone number element defined would not be sufficiently connected to the action object and thus would not have the phone call action recommended as an option.

In the user interface 600, region 640 allows a user to enter a sequence of operations that are carried out to perform the action for the action object. These operations can be defined in any of various ways, such as instructions to an analytics system, API calls to software, reference to a script or executable, and so on. Another region 650 allows a user to define whether the action returns an output, and if so, what type. In the example, no output back to the system is defined for the phone call action. A region 660 includes controls for specifying conditions or restrictions on the use of the action, for example, whether authentication is required before the action can be performed, whether any device capabilities are needed for the action to be performed, whether the action is restricted based on location, and so on. This enables a user to further define the context or scenario in which the action is presented as an option to a user.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
    storing semantic graph data indicating a semantic graph of objects and relationships between the objects, wherein the semantic graph data defines an action object that represents an action that can be performed by the one or more computers, wherein the semantic graph data specifies that a particular attribute is used to perform the action defined by the action object, wherein the semantic graph data defines object types and specifies attributes for the respective object types including identifying one or more object types that have the particular attribute;
    receiving a request from client device over a communication network;
    generating response data to provide to the client device in response to the request;
    determining that an object in the semantic graph is referenced by the response data or is used to generate the response data, wherein the identified object in the semantic graph is an object of one of the one or more object types that have the particular attribute; and
    in response to determining that the object is referenced by the response data or is used to generate the response data, providing, to the client device in response to the request, user interface data configured to cause presentation of an interactive user interface element for the action with the response data at the client device, the interactive user interface element being selectable by a user to initiate the action using a value that the semantic graph data specifies for the particular attribute of the identified object.

2. The method of claim 1, wherein determining that the object in the semantic graph is referenced by the response data or is used to generate the response data comprises identifying the object in search results generated in response to the request, a recommendation generated in response to the request, a user interface provided in response to the request, metadata for a user interface provided in response to the request, data retrieved from a database that is used to process the request, a document provided in response to the request, or a file provided in response to the request.

3. The method of claim 1, wherein determining that the object in the semantic graph is referenced by the response data or is used to generate the response data comprises determining that an operation of an analytics system performed in response to the request involves the object.

4. The method of claim 1, comprising:
    after providing the user interface data, receiving data indicating user interaction with the interactive user interface element that triggers use of the action object to perform the action using the object; and in response to receiving the data indicating the user interaction, performing the action specified by the action object.

5. The method of claim 1, wherein determining that the object in the semantic graph is referenced by the response data or is used to generate the response data comprises identifying a reference to the object the object of the particular object type or data of the particular data type in data for a user interface or data for presentation on a user interface.

6. The method of claim 1, further comprising:
identifying, based on the semantic graph data, one or more conditions associated with the action object; and
determining that the one or more conditions associated with the action object are satisfied;
wherein providing the user interface data for the interactive user interface element is based on determining that the one or more conditions associated with the action object are satisfied.

7. The method of claim 1, comprising:
identifying, based on the semantic graph data, multiple action objects that represent different actions and that are each associated with the object of the particular object type or the data of the particular data type in the semantic graph;
selecting, based on the semantic graph data, a proper subset of the actions represented by the multiple action objects; and
providing user interface data for interactive user interface elements for only the actions in the selected proper subset.

8. The method of claim 1, wherein the one or more computers are part of an analytics system, and the action is an action performed outside the analytics system.

9. The method of claim 1, wherein the one or more computers are part of an analytics system, and the action is an action performed by the analytics system.

10. A system comprising:
one or more computers; and
one or more computer-readable media storing instructions that, when executed by the one or more computers, cause the one or more computers to perform operations comprising:
storing semantic graph data indicating a semantic graph of objects and relationships between the objects, wherein the semantic graph data defines an action object that represents an action that can be performed by the one or more computers, wherein the semantic graph data specifies that a particular attribute is used to perform the action defined by the action object, wherein the semantic graph data defines object types and specifies attributes for the respective object types including identifying one or more object types that have the particular attribute;
receiving a request from client device over a communication network;
generating response data to provide to the client device in response to the request;
determining that an object in the semantic graph is referenced by the response data or is used to generate the response data, wherein the identified object in the semantic graph is an object of one of the one or more object types that have the particular attribute; and
in response to determining that the object is referenced by the response data or is used to generate the response data, providing, to the client device in response to the request, user interface data configured to cause presentation of an interactive user interface element for the action with the response data at the client device, the interactive user interface element being selectable by a user to initiate the action using a value that the semantic graph data specifies for the particular attribute of the identified object.

11. One or more non-transitory computer-readable media storing instructions that, when executed by one or more computers, cause the one or more computers to perform operations comprising:
storing semantic graph data indicating a semantic graph of objects and relationships between the objects, wherein the semantic graph data defines an action object that represents an action that can be performed by the one or more computers, wherein the semantic graph data specifies that a particular attribute is used to perform the action defined by the action object, wherein the semantic graph data defines object types and specifies attributes for the respective object types including identifying one or more object types that have the particular attribute;
receiving a request from client device over a communication network;
generating response data to provide to the client device in response to the request;
determining that an object in the semantic graph is referenced by the response data or is used to generate the response data, wherein the identified object in the semantic graph is an object of one of the one or more object types that have the particular attribute; and
in response to determining that the object is referenced by the response data or is used to generate the response data, providing, to the client device in response to the request, user interface data configured to cause presentation of an interactive user interface element for the action with the response data at the client device, the interactive user interface element being selectable by a user to initiate the action using a value that the semantic graph data specifies for the particular attribute of the identified object.

12. The method of claim 1, wherein the object of the particular object type has a value for the particular attribute or the particular data type provides a value for the particular attribute; and
wherein providing the user interface data is performed in response to determining that the object of the particular object type has a value for the particular attribute or the particular data type provides a value for the particular attribute.

13. The method of claim 1, wherein a set of multiple objects are referenced by the response data or are used to generate the response data; and
wherein the method includes assessing the set of multiple objects to identify objects having attributes specified in the semantic graph data that are used by different action objects defined in the semantic graph data.

14. The method of claim 13, wherein providing the user interface data comprises providing user interface data configured to cause presentation of multiple interactive user interface elements, wherein each of the multiple interactive user interface elements is selectable by a user to cause an action of a different action object defined in the semantic graph.

15. The method of claim 1, wherein the semantic graph data specifies attributes for the respective object types with edges in the semantic graph that connect nodes representing objects in the semantic graph with nodes representing attributes in the semantic graph.

16. The method of claim 1, further comprising determining that the semantic graph data specifies a value for the particular attribute of the identified object;
   wherein providing the user interface data configured to cause presentation of an interactive user interface element for the action is performed in response to determining that the semantic graph data specifies a value for the particular attribute of the identified object.

\* \* \* \* \*

UNITED STATES PATENT AND TRADEMARK OFFICE
CERTIFICATE OF CORRECTION

| | | |
|---|---|---|
| PATENT NO. | : 11,714,843 B2 | Page 1 of 1 |
| APPLICATION NO. | : 16/514946 | |
| DATED | : August 1, 2023 | |
| INVENTOR(S) | : Saurabh Abhyankar, Scott Rigney and Timothy Lang | |

It is certified that error appears in the above-identified patent and that said Letters Patent is hereby corrected as shown below:

On the Title Page

Column 2 (Abstract), Line 3, delete "IN" and insert -- In --.

In the Claims

In Claim 5, Column 25, Line 7, delete "the object the object" and insert -- the object --.

Signed and Sealed this
Sixteenth Day of April, 2024

Katherine Kelly Vidal
*Director of the United States Patent and Trademark Office*